United States Patent Office 3,083,094
Patented Mar. 26, 1963

3,083,094
PURIFICATION OF BERYLLIUM
Bernard Love, Santa Monica, Calif., assignor to Nuclear Corporation of America, Denville, N.J., a corporation of Delaware
No Drawing. Filed June 30, 1959, Ser. No. 823,812
11 Claims. (Cl. 75—84)

This invention relates to the processing of beryllium metal, and has for its principal object the further purification of beryllium of relatively low purity.

Commercial grade beryllium is approximately 99 percent pure, with impurities such as iron, aluminum, silicon, and oxygen, for example, making up the balance. For many purposes commercial grade beryllium is satisfactory; however, for a number of critical chemical reactions, and for certain alloys having critical properties it is desirable to have beryllium of higher purity than that which is commercially available. In this regard it is interesting to note that the values for the physical constants of beryllium vary widely in the literature. This disparity is probably principally a result of the difficulty in purifying beryllium, and the varying impurity content of the beryllium samples which were tested.

In accordance with the present invention, impure beryllium metal may be further purified by melting beryllium with a rare earth metal. In a series of examples using one particular rare earth metal, ytterbium was arc-melted with beryllium in an inert atmosphere in varying percentages up to 20 percent. Mixing or agitation may be employed to facilitate interaction of the rare earth metal with the distributed impurities. The impurities are selectively concentrated in the ytterbium through the formation of ytterbium oxide and other compounds which may be of the intermetalic type. The high density of ytterbium and the resulting ytterbium compounds cause them to settle to the bottom of the melt. The melt was then permitted to cool, and the purified beryllium was separated from the upper portion of the melt. In one case in which 10 percent of ytterbium was present in the melt, photomicrographs of the beryllium before and after purification indicated that the impurity content of the beryllium was reduced by more than 50%. With regard to the amount of rare earth metal to be used, it is desirable to use a sufficient amount of the rare earth metal to react stoichiometrically with the impurities present in the beryllium. For relatively low percentages of impurities, it is desirable to use several times as much of the rare earth material as that required for stoichiometric reaction. Thus, for example, to purify commercial grade beryllium of about 99 percent purity, the rare earth metal may constitute about two to five percent by weight of the melt. If additional rare earth metal is employed, it will merely form an intermetallic compound with the beryllium and reduce the yield of pure beryllium from the upper portion of the melt.

A featured process of the invention therefore includes the steps of melting beryllium with a rare earth metal and separating the slag including the rare earth metal from the purified beryllium.

A more detailed process in accordance with the invention includes the steps of melting beryllium in an inert atmosphere with a sufficient amount of at least one rare earth metal to combine stoichiometrically with the impurities present in the beryllium, mixing or agitating the melt, holding the melt to permit gravity separation of the light beryllium and the heavy rare earth slag, and separating the purified beryllium from the upper portion of the melt.

A more detailed description of the actual technique which was employed in the purification of beryllium with a rare earth metal will now be presented. The melting procedure was carried out in an arc-melting furnace including a water cooled copper hearth plate and a water cooled tungsten tipped opposing or counterelectrode of conventional design. The hearth plate and the counterelectrode were contained in a brass vacuum chamber provided with a viewing port. The furnace was evacuated to an absolute pressure of less than one micron of mercury and then backfilled to the absolute pressure of approximately 25 centimeters of mercury with an inert gas mixture of 75 percent helium and 25 percent argon. The pressure is not critical but is preferably subatmospheric.

The electrode was positioned to form a $\frac{1}{16}''$ gap, and the arc started with a high frequency starter. Eighteen grams of beryllium metal together with two grams of ytterbium metal were employed as the charge for the furnace. Following starting of the arc with a $\frac{1}{16}''$ gap, the electrode was withdrawn to establish a potential of approximately 25 volts, and the direct current was increased to between 100 and 300 amperes. The current was maintained until the entire visible area became molten. At this point in the process, surface tension drew the molten pool into a bead. The total heating time for this initial operation was 30 to 60 seconds.

In order to mix the ytterbium more thoroughly through the beryllium to remove the dispersed impurities, the button was turned over, replaced in the furnace and remelted. Following the initial melting, of course, the bulk of the ytterbium and the ytterbium slag was located at the bottom of the button in view of the much higher density of ytterbium (6.95 grams per cubic centimeter) than beryllium (1.82 grams per cubic centimeter). When the button was turned over and remelted, the heavy ytterbium was mixed through the beryllium as it drifted under the force of gravity toward the bottom of the remelted button.

Several photomicrographs were taken to compare the beryllium sample of commercial grade purity with the purified beryllium from the top of the melt as well as with the ytterbium slag from the bottom of the melt formed as described above. The composition of the original beryllium metal of commercial grade was at least 99 percent beryllium, 0.05 to 0.20 percent iron, 0.5 to 0.20 percent aluminum, and 0.05 to 0.10 percent silicon. In addition, an undetermined quantity of oxygen less than 75 percent was present.

The photomicrograph of the commercial grade beryllium showed a striated effect together with a large number of dots indicating impurity points. Following purification by the melting process described above, the purified beryllium from the upper portion of the melt showed a great reduction in the number and darkness of the striation lines and the dots indicating impurity points. A comparison of the two photomicrographs taken at comparable magnifications of 100 diameters indicates that a reduction in impurities of at least 50 and probably more than 75 percent has been obtained. The photomicrograph of the ytterbium slag showed heavy striations and dark areas indicative of the presence of many impurities and vairous intermetallic compounds in this portion of the melt.

The process described above was for the addition of 10 percent by weight of ytterbium to beryllium. Other alloys containing nominally 2½ percent, 5 percent and 20 percent ytterbium were also prepared, and they exhibited the same general behavior. Supplemental work with others of the rare earth materials indicates that they are also suitable for use in this process.

The rare earth materials include the elements of atomic number 57 through 71. One of the group, promethium, atomic number 61, does not occur naturally, but is a fission product. Scandium and yttrium, atomic numbers 21 and 39, occur together with the rare earths in nature, and are also group IIIA elements. These last two elements are therefore generally included in the term "rare earth" metals and are so included in the present specification and claims. For the purposes of the present invention, the density and the melting and boiling points of the rare earth metals and of beryllium are particularly of interest. Accordingly, they are set forth in the following table, in which the best currentaly available figures are set forth:

| Element | Atomic Number | Density (G/cc.) | Melting Point °C | Boiling Point °C |
|---|---|---|---|---|
| Be | 4 | 1.82 | 1,283 | 2,970 |
| Sc | 21 | 3.02 | 1,570 | 2,450 |
| Y | 39 | 4.47 | 1,550 | 3,000 |
| La | 57 | 6.18 | 920 | 4,200 |
| Ce | 58 | 6.80 | 804 | 2,900 |
| Pr | 59 | 6.80 | 920 | 3,000 |
| Nd | 60 | 7.00 | 1,020 | 3,150 |
| Sm | 62 | 7.49 | 1,050 | 1,600 |
| Eu | 63 | 5.166 | 900 | 1,400 |
| Gd | 64 | 7.86 | 1,350 | 2,700 |
| Tb | 65 | 8.25 | 1,365 | 2,500 |
| Dy | 66 | 8.55 | 1,400 | 2,300 |
| Ho | 67 | 8.79 | 1,500 | 2,300 |
| Er | 68 | 9.15 | 1,520 | 2,600 |
| Tm | 69 | 9.31 | 1,600 | 2,100 |
| Yb | 70 | 6.95 | 824 | 1,500 |
| Lu | 71 | 9.84 | 1,700 | 1,900 |

Any of the rare earth metals as discussed above may be used, either alone or in combination. Furthermore, when the term "rare earth metal" is employed, this encompasses an alloy including several of the rare earth elements.

In the examples of purification set forth above, relatively simple procedures were employed. Thus, for example, the mixing was performed principally by physically turning over the alloy button. In addition, the action of the arc probably caused some mixing action. The material was held in the molten state for a time period sufficient to permit most of the ytterbium to settle under the force of gravity to the bottom. It is contemplated, however, that improved results could be obtained by increasing the agitation during a preliminary portion of the cycle and by holding without agitation for a moderately long time period, such as several minutes toward the end of the cycle. In general, the reaction between the rare earth and the beryllium impurities will be complete within a half hour of mixing, and five or ten minutes would normally constitute ample holding time for separation of the beryllium and the rare earth compounds. It may also be noted that zone refining may be utilized to supplement the gravitational separation of the rare earth metals and compounds, particularly in cases where the density of the rare earth metal is only slightly greater than that of beryllium. In this regard, the case of scandium in which the density of the rare earth metal is only 3.02 as compared to 1.82 for beryllium is particularly in point.

It is to be understood that the above described arrangements are illustrative of the application of the principles of the invention. Numerous other arrangements may be devised by those skilled in the art without departing from the spirit and scope of the invention.

What is claimed is:

1. A method for purifying beryllium, comprising the steps of adding a rare earth metal to impure beryllium, containing, as impurities, iron, aluminum, silicon and oxygen heating and mixing the rare earth metal and the beryllium to form a melt, holding the melt to permit gravity separaiton of the pure beryllium from the slag including the rare earth metal, and separating the pure beryllium by removing it from the upper portion of the melt.

2. A process for the purification of beryllium, comprising the steps of melting beryllium containing, as impurities, iron, aluminum, silicon and oxygen with a rare earth metal, mixing the resultant melt, and separating the pure beryllium from the top of the melt from the slag including the rare earth metal at the bottom of the melt.

3. A process for purifying beryllium, comprising the steps of melting beryllium containing, as impurities, iron, aluminum, silicon and oxygen with a rare earth metal, cooling the melt, and separating the purified beryllium from the slag including the rare earth metal.

4. A method of purifying beryllium, comprising melting beryllium having a predetermined amount of ion, aluminum, silicon and oxygen as impurities with a quantity of a rare earth metal sufficient, on a stoichiometric basis, to react with said impurities, and separating the purified beryllium from the slag including the rare earth metal.

5. A process for the purification of beryllium, comprising the steps of melting beryllium containing, as impurities, iron, aluminum, silicon and oxygen with a rare earth metal in an inert atmosphere, agitating the resultant melt, cooling the melt, and separating the pure beryllium from the top of the melt from the slag including the rare earth metal at the bottom of the melt.

6. A method of purifying beryllium, comprising melting beryllium having a predetermined amount of iron, aluminum, silicon and oxygen as impurities with several times the amount of rare earth metal required on a stoichiometric basis to react with said impurities, and separating the purified beryllium from the slag including the rare earth metal.

7. A process for the purification of beryllium, comprising the steps of melting beryllium containing, as impurities, iron, aluminum, silicon and oxygen with a rare earth metal in an inert atmosphere, and separating the pure beryllium from the top of the melt from the slag including the rare earth metal at the bottom of the melt.

8. A process for the purification of beryllium, comprising the steps of melting beryllium containing, as impurities, iron, aluminum, silicon and oxygen with a rare earth metal, agitating the resultant melt, cooling the melt, and separating the pure beryllium from the top of the melt from the slag including the rare earth metal at the bottom of the melt.

9. A process for the purification of beryllium, comprising the steps of melting beryllium containing, as impurities, iron, aluminum, silicon and oxygen with ytterbium in an inert atmosphere, and separating the pure beryllium from the top of the melt from the slag including the ytterbium at the bottom of the melt.

10. A process for the purification of beryllium, comprising the steps of melting beryllium containing, as impurities, iron, aluminum, silicon and oxygen with erbium in an inert atmosphere, and separating the pure beryllium from the top of the melt from the slag including the erbium at the bottom of the melt.

11. A method for purifying beryllium comprising the steps of inserting a quantity of rare earth metal and impure beryllium containing as impurities, iron, aluminum, silicon and oxygen, into a furnace, the amount of rare earth metal being several times that required to react stoichiometrically with the impurities in the beryllium, evacuating the furnace, backfilling the furnace with an inert gas, heating and mixing the rare earth metal and beryllium to form a melt, holding the melt without mixing to permit gravity separation of the purified beryllium from the slag including the rare earth metal, and separating the beryllium from the slag.

References Cited in the file of this patent

FOREIGN PATENTS 773,822   Great Britain _____ May 1, 1957

OTHER REFERENCES

Proceedings of the International Conference on Peaceful Uses of Atomic Energy, August 8–20, 1955, volume 8, pages 587–599, United Nations, New York.